United States Patent [19]

Klopfenstein et al.

[11] Patent Number: 4,538,693

[45] Date of Patent: Sep. 3, 1985

[54] WEIGHING MACHINE

[75] Inventors: King L. Klopfenstein, Prospect Heights; Robert H. Connors, Chicago; Steven P. Bergholt, Elgin, all of Ill.

[73] Assignee: Triangle Package Machinery Co., Chicago, Ill.

[21] Appl. No.: 499,385

[22] Filed: May 31, 1983

[51] Int. Cl.³ .................... G01G 19/22; G01G 13/16; G01G 13/34; B67D 3/00

[52] U.S. Cl. ........................... 177/25; 177/59; 177/112; 222/482

[58] Field of Search ............. 177/25, 58, 59, 112; 222/482

[56] References Cited

U.S. PATENT DOCUMENTS

| | | | |
|---|---|---|---|
| 4,398,612 | 8/1983 | Mikami et al. | 177/25 |
| 4,399,880 | 8/1983 | Konishi | 177/25 X |
| 4,418,771 | 12/1983 | Henry et al. | 177/25 X |
| 4,454,924 | 6/1984 | Minamida | 177/25 |

*Primary Examiner*—George H. Miller, Jr.
*Attorney, Agent, or Firm*—Neuman, Williams, Anderson & Olson

[57] ABSTRACT

A weighing machine is disclosed that accepts product from a source, segregates it into discrete quantities, and combines a number of the discrete quantities into a group that closely approximates a target weight. The machine includes a feeder means that selectively transports product from the source. Accumulator means receive product from the feeder means and discharge discrete quantities of product therefrom. Weighing means accept product from the accumulating means and determine the weights thereof. Divertor means receive product from the weight sensing means and direct it in one of a plurality of directions. Holding means receive product from the divertor means and retain the product until it is selectively discharged. Collecting means receives product from the holding means, consolidates it, and directs it to another location.

23 Claims, 8 Drawing Figures

WEIGHING MACHINE

This invention relates to a machine which may provide, from a variety of product sources, including a bulk supply, a continuum of discrete quantities of product with each quantity having a predetermined target weight, or a weight very close thereto. This is accomplished by dividing the source product into a plurality of discrete quantities that are a fraction of the target weight. Each of the fractional weight quantities becomes part of a set for which all possible fractional weight combinations are determined. The combination providing the target weight, or the preferred weight closest to the target weight, is selected. In many instances the preferred weight is that weight closest to but not less than the target weight; other criteria for selecting the preferred weight are possible. Electrical circuitry may be used to determine the possible weight combinations and select the combination providing the preferred weight. Such apparatus disclosed and claimed in this application is of a novel design and provides a weighing machine which is of more economical construction and compact design than weighing machines previously known.

As used herein, "package weight" is the actual weight of product which the weighing machine provides on any single machine cycle, "target weight" is the weight of product which the user desires the weighing machine to provide on any single machine cycle, "fractional weight" is the weight of a fractional weight quantity available on any single machine cycle, "preferred weight" is that combination of fractional weights which the user desires the weighing machine to use to make up the package weight on any single machine cycle, and an "acceptable weight" is a combination of fractional weights which results in a package weight within a range of weights predetermined by the user. As mentioned, the preferred weight is often defined as that combination of fractional weights which is closest to but not less than the target weight, but other criteria are possible. An acceptable weight is correspondingly often defined as a weight which is greater than the target weight but less than a known weight in excess of the target weight, but other criteria for this term are also possible.

In the past, weighing machines have been slow, inaccurate, expensive, and bulky. In addition, they have abused the product, failed to achieve acceptable weights, and suffered from reliability problems due to their complexity. In an effort to overcome such disadvantages, some recent weighing machines have used a series of bins or hoppers to collect product from a continuous product supply, such as a conveyor. Such machines convert the continuous product flow into a series of discrete product groups that are each deposited onto a scale and weighed. Preferably, each discrete product group weighs a fraction of the target weight so that a number of them must be combined to obtain the package weight. For instance, if target weight is 100 grams, the weighing machine might create ten discrete fractional weight groups, each having an arbitrary weight between approximately 10 grams and 30 grams. The machine considers the possible fractional weight combinations available by combining the discrete product groups and selecting the combination providing the preferred weight. By increasing the number of discrete product groups, or limiting the variation in weight for each discrete product group, the average deviation of the package weight from the target weight normally decreases.

Such prior art weighers have utilized a circular scale arrangement and radial product feed. Product is supplied by a chimney or hopper feeding directly onto a central distribution cone. Not all product may be fed this way because it may fail to feed through the chimney or hopper, or it may be damaged by such a feed configuration. In other instances product is supplied by a conveyor, which makes it difficult to match the linear discharge end thereof with the radial dispersion of the distribution cone. For instance, it is desireable for the product to discharge in a narrow stream onto the apex of the distribution cone, but this is difficult to achieve due to vagaries in product flow and the unique feeding characteristics of each product. Thus, some scales may be deprived of product or starved while others receive an excessive amount of product and are flooded. This adversely impacts the ability of the weigher to achieve satisfactory operation. When a scale is starved, it is effectively eliminated because it is empty and cannot contribute to the possible combinations available to attempt to make the target weight. When a scale is flooded, it reduces the number of additional discrete weights that may be added to attempt to meet the target weight, again reducing the possible combinations available in attempting to meet the target weight. If the flooding is severe it may overflow the scale or place a weight of product in the scale which exceeds the acceptable package weight, requiring manual intervention or shut-down. The incidence of such problems is greatly reduced with the present invention.

The circular scale arrangement may also result in a bulky design that does not make an efficient use of space. The various mechanisms are spaced outwardly from the distribution cone to provide sufficient clearance between neighboring units, and this makes the unit unduly large. In addition, some of the operating mechanisms are located in the center, which makes access and service difficult. The present invention eliminates these problems with an in-line or linear system.

The apparatus used in the prior art to provide discrete weighed amounts of product usually require an excessive number of scales, which is unduly expensive, and do not utilize sufficient means to optimally regulate product flow to the scales. This causes great variation in the weight of product in the scales, utilization of the scales in a manner which is not optimal, and an excess or insufficient amount of product in the scales. Any of these conditions reduces the number of combinations available from which to attempt to meet the target weight, thereby reducing the accuracy of the weighing machine. To a limited extent, this has been alleviated by increasing the number of scales, but this also escalates the cost, complexity, and size of the weigher. The present invention effectively reduces the number of scales, and does so without adversely affecting the accuracy of the weigher.

SUMMARY OF THE INVENTION

Accordingly, it is an object of the present invention to provide an improved weighing machine which readily overcomes the aforementioned problems.

It is a further object of the present invention to provide an improved weighing machine that provides a quantity of product having a predetermined weight.

It is a further object of the present invention to provide an improved and more compact weighing machine that improves accuracy and reliability at minimal cost.

Further and additional objects will become apparent from the description, accompanying drawings, and appended claims.

In accordance with an embodiment of the invention, a weighing machine is provided for producing a quantity of product having a predetermined weight. Feeder means supplies product from a source. Multiple accumulator means receive the product from the feeder means and selectively discharge discrete amounts therefrom. Weighing-divertor means, one for each accumulator means, receive the discrete product amounts from the accumulator means, weigh them, and discharge the product in one of a plurality of directions. Holding means receive the product from the weighing-divertor means and selectively hold it until it is discharged. Collecting means receives the product from any of the holding means, consolidates it, and directs it to another location.

DESCRIPTION OF THE ILLUSTRATED EMBODIMENTS

Figure 1:
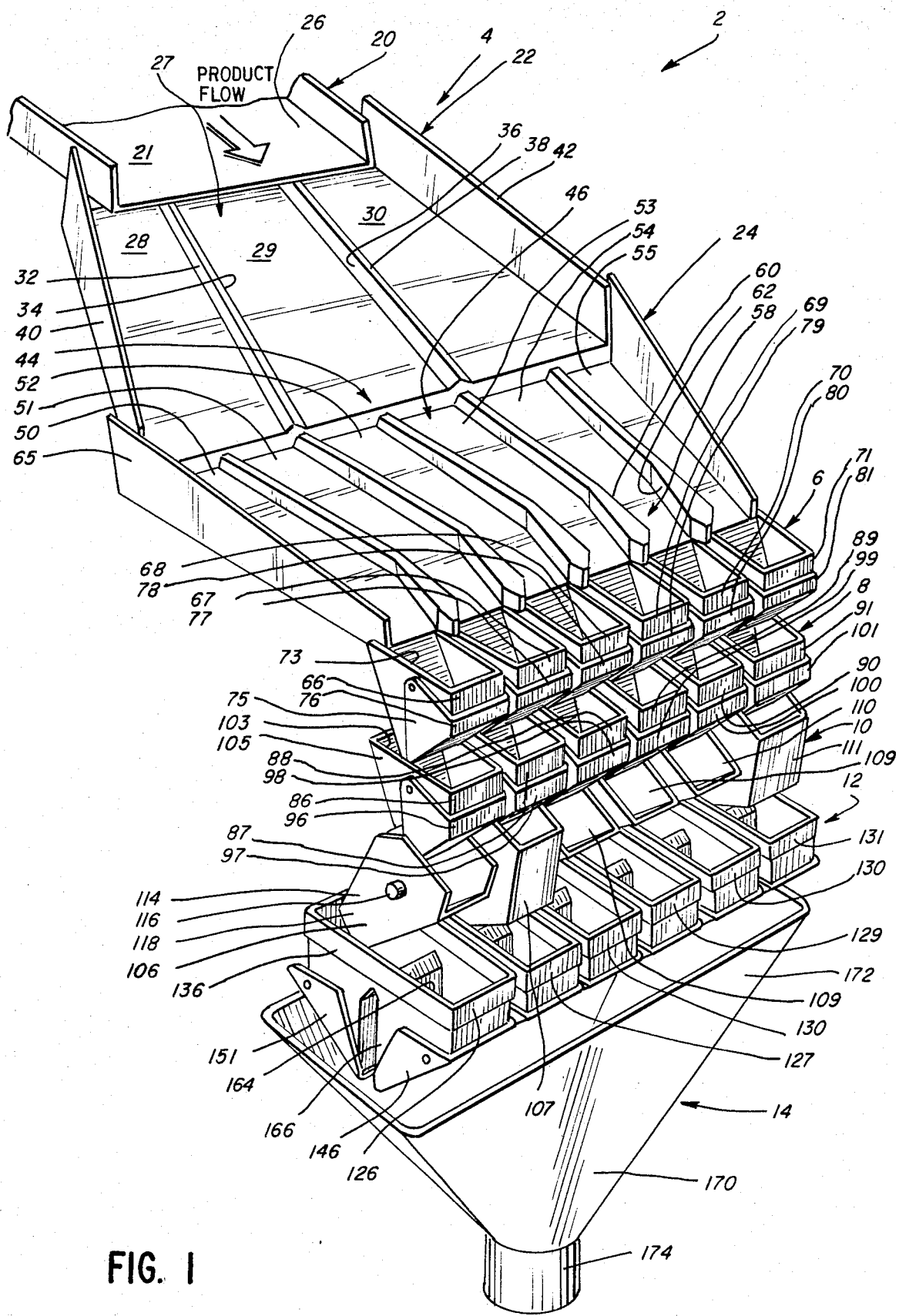
FIG. 1 is a perspective view of one embodiment of the present invention.
Figure 2:
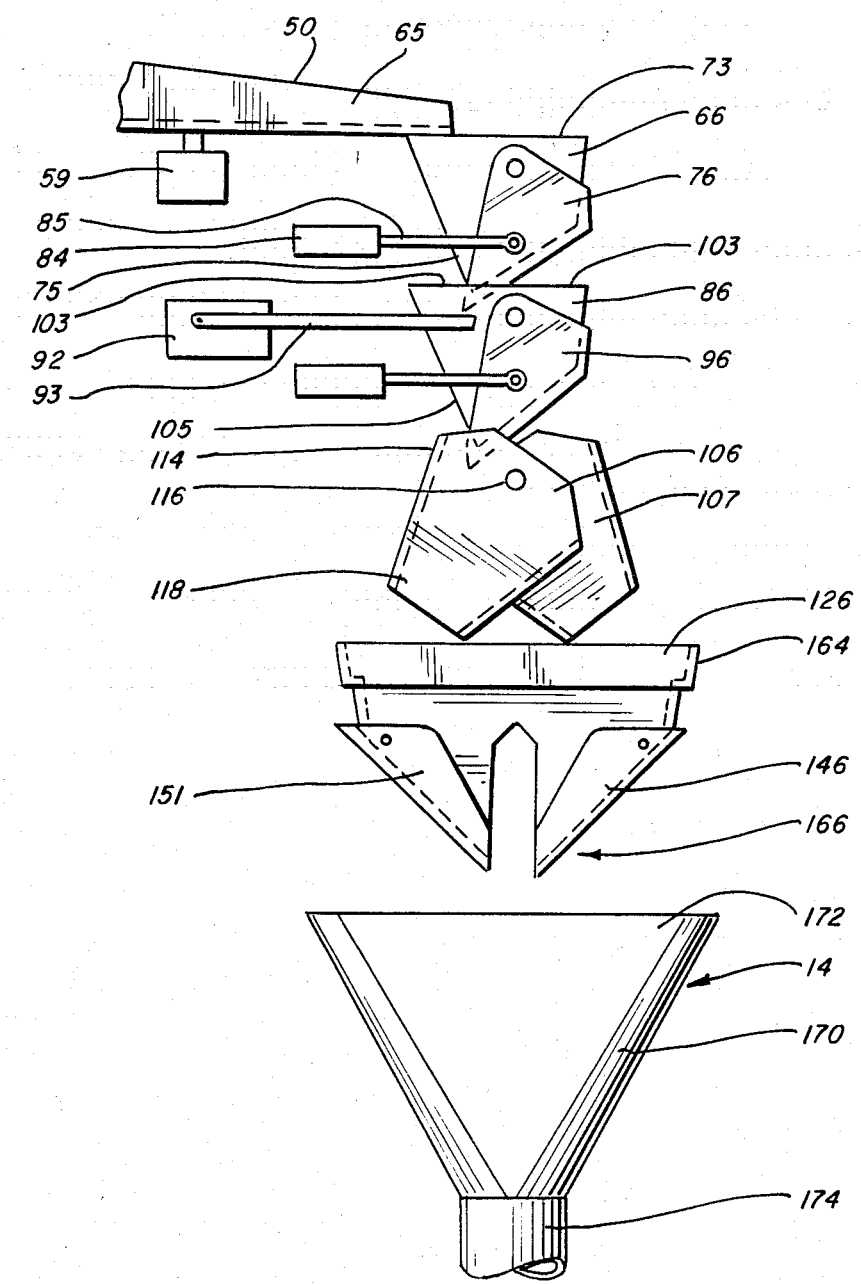
FIG. 2 is a side plan view of the embodiment shown in FIG. 1.

Referring to FIGS. 1 and 2, and using like numerals to designate like items, one embodiment of the present invention for a weighing machine 2 is shown. In major sections it includes, moving in the direction of product flow, an in-line tripartite feeder means 4, a side-by-side row of accumulating means 6, a side-by-side row of weighing means 8, a side-by-side row of pivotally mounted divertor means 10, two parallel rows of side-by-side holding means 12, and a collecting means 14. The necessary frame, support, and operational or control means have been omitted in all figures for clarity, as it would be clear to one skilled in the art how to incorporate the unillustrated features.

Before describing each section identified above, the in-line arrangement of the weighing machine 2 is to be noted. Product moves in a uniform flow cascading down through a series of sections that control or gate product flow. There is a linear transfer from one section to the next, and this avoids the problems inherent when changing from a linear flow to a radial flow or from a radial flow to a linear flow. The linear arrangement is also more compact, making it generally more compatible with other packaging equipment, and it permits one to make a more efficient use of plant space. In addition, most of the operating mechanisms are easily observed from the front of the machine, rather than being hidden in the interior of a machine having a circular configuration, and all of the operating mechanisms of the same type can be observed from a single side of the machine.

The in-line feeder means 4 includes three stages of vibratory product feed tray means 20, 22, 24. Individually and collectively they advance the product from the product source (not shown) to the row of accumulating means 6 in the direction of the arrow marked Product Flow. The first feed tray means 20 is a single tray 21 with upturned sides that advances product in response to downstream needs by a rapid vibrational motion, as is well known. A conventional vibrating means (not shown) is attached in a conventional manner and its amplitude and frequency of operation may be adjusted or altered as necessary or desireable to regulate the rate of product flow or to accommodate product having different handling characteristics. The vibrational motion of the tray 21 causes the product to spread itself evenly across the tray, both in the direction of product flow and in the transverse direction, to provide a relatively uniform flow of product. At the discharge end 26 of the tray 21 the product falls onto the collective entrance end 27 of the second feed tray means 22.

The second feed tray means 22 comprises three coextensive feed trays 28, 29, 30 disposed in a side-by-side relationship. Each tray 28, 29, 30 is physically isolated from the other, although their adjacent side portions protrude upwardly and overlap to prevent a loss of product therebetween. Specifically, the inner lateral edge 32 of outer tray 28 extends upwardly from the tray face and overlaps the adjacent upstanding lateral edge 34 of center tray 29. A similar overlapping arrangement exists for the other lateral edge 36 of the center tray 29 and the inner lateral edge 38 of the other outer tray 30. The exact configuration or degree of the overlap is discretionary, provided that product loss is minimized and that the trays do not interfere with one another either when vibrating or when stationary. The upward protrusion also assists in channeling or segregating product flow. The outer edges 40, 42 of the outer trays 28 and 30, respectively, are turned up to laterally contain the product flow.

Each tray 28, 29, 30 of the second feed tray means 22 is operatively connected to an individual vibrator or other motion device so that each tray 28, 29, 30 may operate independently of the others. The appropriate vibrator is energized in response to a downstream demand for product to advance product and to disperse it evenly in a direction transverse to product flow. This provides a relatively uniform flow of product at the collective discharge end 44 of the second tray means 22, where product falls onto the collective entrance ends 46 of the third feed tray means 24.

The third feed tray means 24 comprises six feed trays 50–55 disposed in a side-by-side relationship. Each tray 50–55 is physically isolated from the other, although their adjacent side portions protrude upwardly and overlap or abut each other to prevent a loss of product therebetween. The overlapping arrangement of the adjacent trays is similar to the overlapping arrangement aforenoted for the second feed tray means 22, and preferably protrudes upwardly to a greater height at least at the collective discharge end 58 to completely segregate product flow into six separate channels. For example, the lateral edges 60, 62 of tray 53 extend upwardly from the tray face. In a similar manner the adjacent lateral edges of trays 52 and 54 extend upwardly and may overlap the lateral edges of tray 53 to minimize product loss therebetween. The overlap should also permit independent operation of each tray 50–55 so that one may vibrate to advance product while its neighboring tray or trays remain stationary. The outer edges 64, 65 of the outermost trays 50 and 55, respectively, are turned up to laterally contain the product flow within the trays. The discharge ends of each tray may narrow slightly to concentrate the segregated product flow for transfer to the row of accumulating means 6 disposed thereunder and prevent the product from falling between the accumulators. Instead of narrowing the discharge ends, shields may be placed over the spaces between the accumulators to deflect the flow of material into the accumulators.

Each tray of the third tray means 24, as for the second tray means 22, is operatively connected to an individual vibrator 59 or other motion device so that each tray 50–55 may operate independently of the others. The appropriate vibrator is energized in response to a downstream demand for product to advance product and to further disperse it evenly. Product is discharged in a linear fashion from the collective discharge ends 58.

Taken as a unit, the entire tripartite feeder means 4 accepts product discharged onto first tray 21 by a product source, and evenly distributes it in the direction of product flow and transverse thereto. The three trays comprising the second feeder means 22 further disperse product flow and the upwardly protruding lateral tray edges begin to divide the flow into three channels. The height of the upward protrusions may be selected to permit limited overflow from one tray to another so that excess product will be laterally redistributed to areas of sparse product flow. The six trays 50–55 comprising the third feeder means 24 still further disperse product flow, and the upwardly protruding lateral tray edges segregate the product flow into six individually controlled channels. Thus, a nonuniform or erratic supply of product is converted into an even distribution of six relatively uniform, individually controlled product feeds.

The row of accumulating means 6 receives product from the superposed feeder means 4. The row of accumulating means 6 comprises a side-by-side row of six accumulators having bucket-like chambers 66–71 that are fixed to the frame of the weighing machine and disposed immediately below the discharge ends of the respective individual trays 50–55 of the third tray means 24. There is preferably one accumulator for each individual tray 50–55 of the third feed tray means 24. Each accumulator chamber, such as 66, has the shape of a hollow, generally triangular prism, with the top portion 73 being open to permit product to fall thereinto from its respective superposed feed tray, i.e. feed tray 50, of the third feed tray means 24. Each accumulator chamber has, on the bottom portion 75, an opening door 76–81 that is hinged on opposite sides thereof. The door swings out away from the bucket-like accumulator chamber, permitting the product deposited therein to slide downwardly to one of the weighing means 8 therebelow. The door of each accumulator is operatively attached to a separate mechanical or electromechanical device 84 to selectively open and close it independently of the doors on the other accumulators. A dual action pneumatic cylinder, electrical solenoid, or the like is suitable, and may be located on the opposite side of the accumulator as the door, with a bail 85 or other attachment to connect it to the door 76. Each individual door opens or remains in its normally closed position in response to downstream demands for product.

The row of weighing means 8 receives product from the superposed row of accumulating means 6, and determines the weight of each discrete amount of product deposited therein. The row of weighing means 8 comprises a side-by-side row of six scales with bucket-like chambers, i.e., weigh buckets, 86–91. Each weigh bucket is individually supported by a weight sensing means 92 by a connecting cantilevered arm 93 or the like. There is one scale for each accumulator, and each scale is disposed immediately below the bottom or discharge end 75 of each respective accumulator chamber to receive the contents thereof. The weight sensing means may be a load cell, balanced mass weigh cell, or a spring balanced weigh cell. The weigh buckets have a configuration similar to that of each accumulator chamber, including an open top portion 103 and a bottom portion 105 with an opening door 96–101. Each door is operatively attached to a device to selectively open and close it independently of the doors on the other weight buckets to release the product held therein. See U.S. Pat. No. 3,371,731 and Re.27,506, both of which are incorporated herein by reference, for a description of a suitable weight sensing means. Each weigh bucket door 96–101 opens or remains in its normally closed position in response to downstream demands for product.

The row of divertor means 10 receives product from the superposed weighing means 8. The row of divertor means 10 comprises a side-by-side row of six divertors 106–111. There is one divertor for each scale, and each divertor is disposed immediately below the bottom or discharge end 105 of each respective scale to receive product therefrom. Each divertor, such as 106, is an elongated rectangular tube that is mounted near its upper, product receiving end 114 for pivotal movement around post 116. The divertor is bistable and pivots to position its lower, product delivering end 118 above one of two holding chambers therebeneath that comprise a part of the two rows of holding means 12. The pivoting action of the divertor is effected by conventional means, such as that disclosed to operate the doors 76–81, 96–101 on the accumulator chambers and weigh buckets. The upper end 114 is configured to receive and contain all of the product released by the respective superposed scale regardless of the position to which the divertor is directed. Each divertor moves in response to downstream demands for product.

The two rows of holding means 12 receive product from the superposed row of divertor means 10. The two rows of holding means 12 comprises two rows of side-by-side holding chambers 126–131, 136–141 arranged in a two-by-six matrix, for a total of twelve holding chambers. The holding chambers are fixed to the frame of the weighing machine and each is disposed immediately below one of the two discharge positions of the respective divertors. There are preferably two holding chambers for each divertor, and each pair is aligned in the direction of divertor movement, which is preferably in line with the general direction of product flow. Each of the twelve holding chambers, such as 126, has a configuration similar to that of each accumulator chamber, including an open top portion 164 and a bottom discharge portion 166 with an opening door 146 or 151. Each door is operatively attached to a device to selectively open and close it independently of the doors on the other holding chambers, in a manner as disclosed hereinbefore. For convenience, the holding chambers comprising a pair, such as 126, 136, may be back to back.

The collecting means 14 receives product from any of the superposed holding chambers 126-131, 136-141. It comprises a funnel-like chute portion 170 having an upper or mouth section 172 that encompasses all of the discharge portions of the two rows of holding means 12. The funnel-like chute portion 170 tapers to a common feed tube 174 that consolidates the product released by the various holding chambers and directs or conveys it to another location, such as a packaging machine or other filling apparatus.

Figure 3:
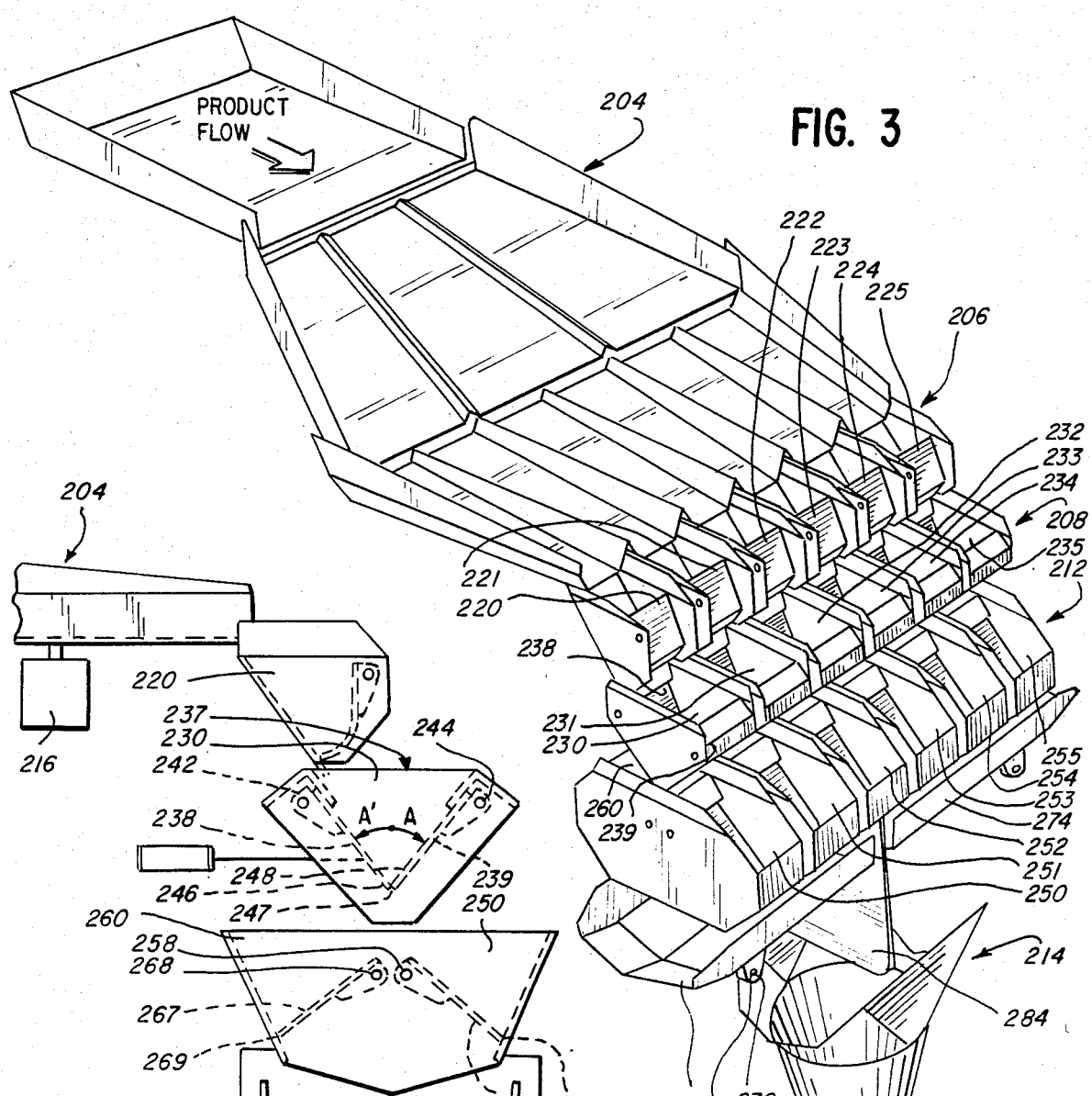
FIG. 3 is a perspective view of another embodiment of the present invention.
Figure 4:
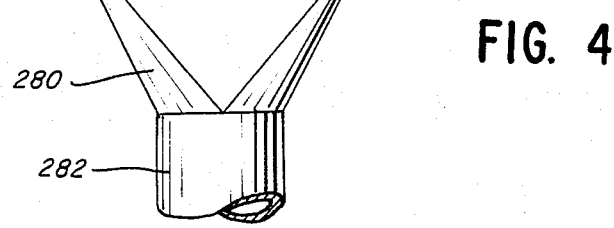
FIG. 4 is a side plan view of the embodiment shown in FIG. 3.

FIGS. 3 and 4 illustrate an alternate embodiment of the present invention. In major sections it includes, moving in the direction of product flow, an inline tripartite feeder means 204, a side-by-side row of accumulating means 206, a side-by-side row of double door weighing means 208, two rows of side-by-side holding means 212, and a collecting means 214. The necessary frame, support, and operational or control means have been omitted in both figures for clarity, as it would be clear to one skilled in the art how to incorporate the unillustrated features.

The alternate embodiment illustrated in FIGS. 3 and 4 operates on many of the same principals as previously described in connection with FIGS. 1 and 2. It also includes many of the same structural features, such as the tripartite feeder means 204 that cascades product from one tray to three trays to six trays for a uniform yet independently controlled product flow; the multiple feeder vibrational means 216; the six side-by-side accumulator buckets 220-225 that comprise the row of accumulating means 206; and the accumulator operational means, such as air cylinders or solenoids.

The row of weighing means 208 receives product from the superposed row of accumulating means 206 as described in connection with FIGS. 1 and 2. The row of weighing means comprises a side-by-side row of six scales with bucket-like chambers, i.e., weigh buckets 230-235 that are supported by a weight sensing means in the aforenoted manner. Each weigh bucket 230-235 of each scale has an upper open portion 237 and a pair of selectively and independently operable bottom closing doors, as shown at 238, 239 for weigh bucket 230. The doors may form opposing sides of the weigh bucket, and are hinged at their top portions 242, 244 thereof, respectively, so that the bottom portions 246, 248, respectively, may swing outwardly, away from the product in the weigh bucket. When the doors are closed, their bottom portions 246, 248 meet along a mid-line 247 or the like to close the bottom of the weigh bucket, and each is inclined with respect to the vertical axis at a relatively steep angle A or A'. The angle should be sufficiently steep so that when one door is opened by swinging downwardly and out the product in the weigh bucket will slide off the face of the opposite door down into the holding chamber 250 below. This configuration of opposed inclined bottom closing doors permits product to be discharged in either of two directions, as required by downstream demands. Thus, the double door weigh bucket design effectively combines the functions of the scale and divertor, and forms weighing-divertor means, whereas in the embodiment of FIGS. 1 and 2 the scale including weigh bucket 86 and divertor 106 combine to form weighing-divertor means. The apparatus to independently open and close the weigh bucket doors may be of the type disclosed earlier.

The two rows of holding means 212 receives product from the superposed row of a double door weighing means 208. The two rows of holding means comprises two rows of side-by-side holding chambers 250-255, 260-265 that have an open top, bucket-like configuration to catch product dropped from the respective superposed scale. Holding chambers 261-265 are immediately behind holding chambers 251-255, in one-to-one correspondence, just as holding chamber 260 is immediately behind holding chamber 250. The holding chambers are arranged in a two-by-six matrix for a total of twelve holding chambers. Each is fixed to the frame of the weighing machine and is disposed immediately below one of the twelve bottom closing doors for the individual scales 230-235. Thus, for each weigh bucket such as 230, there are two corresponding holding chambers, such as 250, 260, i.e., one beneath each weigh bucket door, such as 238, 239. Each holding chamber 250-255, 260-265 has a selectively and independently operable bottom closing door, i.e. door 257 for holding chamber 250 and door 267 for holding chamber 260. Each door may form a bottom or a side of the holding chamber, as desired, and may be hinged at the top portion 258, 268 so that the bottom portion 259, 269 may swing downwardly away from the product in the holding chamber. When a door is closed it seals the bottom of the holding chamber to retain the product. When a door is open it permits the product to fall into the collecting means 214.

The collecting means 214 receives product from any of the superposed holding chambers 250-255, 260-265. It comprises a pair of tilting chutes 272, 274, each disposed horizontally, when at rest, immediately below the doors of the holding chambers. Referring to chute 272, it is generally U-shaped when viewed in cross-section, having a width generally greater than the discharge portion of the holding chambers so that discharged product will be caught and contained therein. A pin 276 and clevis 278 combination attached to the bottom of the chute at the proximal end thereof connect it to the frame of the weighing machine and permit it to tilt downwardly away from the holding chambers and toward a funnel 280 and connected pipe 282. Any well known means may be utilized to impart and control the tilting action. A splash plate 284 is vertically disposed at the distal end of the chute 272 to prevent any product from prematurely sliding off the end of the chute before it is tilted toward the funnel 280. The funnel has an open mouth at the upper end that consolidates the product supplied to it and delivers it to pipe 282. Pipe 282 may transport or convey the product to another location, by gravity or otherwise.

The collecting means may comprise a single tilting chute, or a pair of in-line chutes 272, 274 as illustrated, each one underneath one half of the holding chambers, as necessary or desirable. Such an arrangement is desirable when weighing fragile product which may be damaged by a relatively long drop from the holding chamber to the funnel. Use of the tilting chute results in a relatively short drop.

Figure 5:
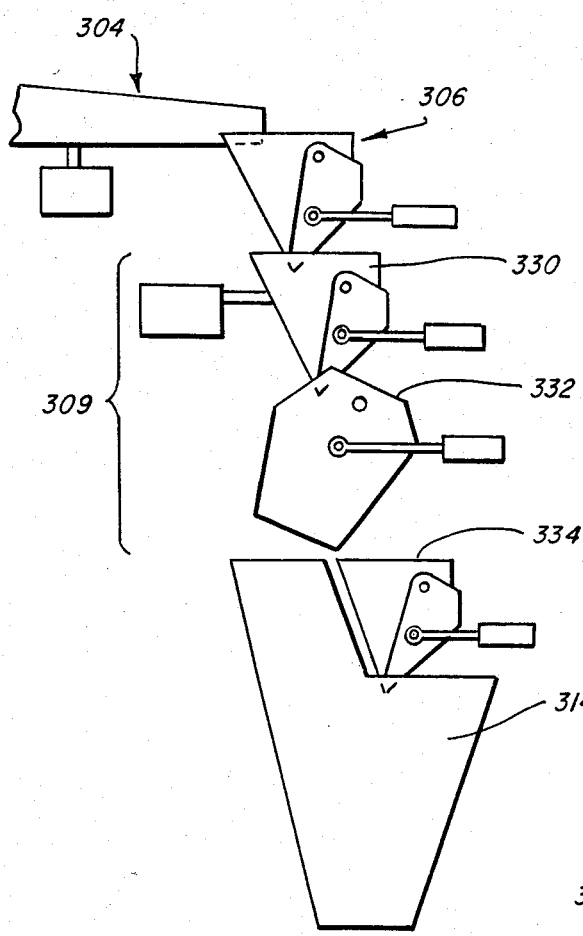
FIGS. 5 and 6 are side plan views in schematic form of further embodiments of the present invention.
Figure 6:
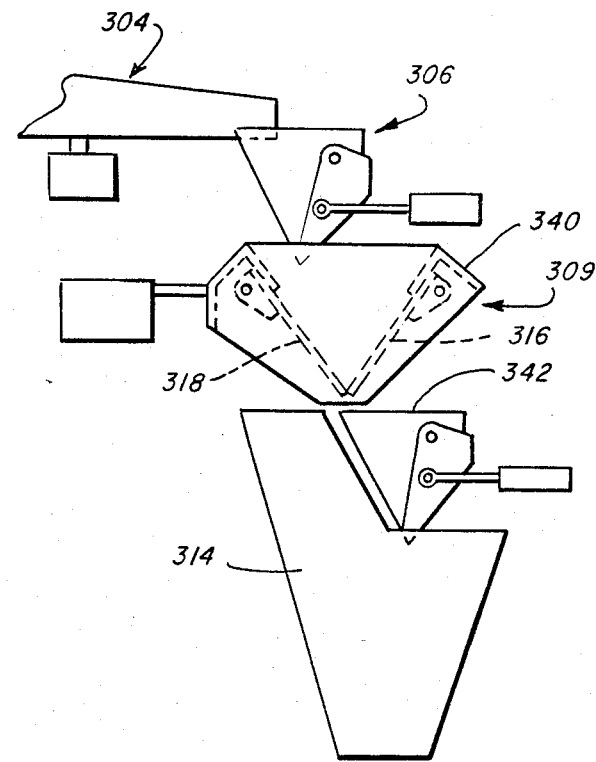

FIGS. 5 and 6 illustrate in more schematic form two further embodiments of this invention somewhat similar to the previously described embodiments but using only one holding chamber for each weighing-divertor means while maintaining many of the advantages of this invention. The embodiment of FIGS. 5 and 6 each include feeder means 304 supplying product to, in turn, a row of accumulating means 306, a row of weighing-divertor means 309, and either to a row of holding chambers or directly to collecting means 314. The construction of the apparatus of FIGS. 5 and 6 as thus far described will be apparent from the previous description of the embodiments of FIGS. 1-4. In the FIG. 5 embodiment, each of the weighing-divertor means in the row 309 includes a separate scale having a weigh bucket 330 and a divertor 332. The divertor 332 is effective to selectively direct the product from weigh bucket 330 either to a holding chamber 334 or directly to collecting means 314. Product from holding chamber 334 may also be discharged into collecting means 314. In the FIG. 6 embodiment, each of the weighing-divertor means in the row 309 includes a double door weigh bucket 340 quite similar to the weigh bucket of the embodiment in FIGS. 3 and 4. Product from the double door weigh bucket 340 may be discharged either to a holding chamber 342 or directly to collecting means 314 through bottom doors 316 and 318, respectively. Product from holding chamber 342 may also be discharged into collecting means 314.

In the embodiments of FIGS. 5 and 6 the function of the holding means performed by the holding chambers of the embodiments of FIGS. 1-4 are performed both by the holding chamber 334, 342 and the weigh buckets 330, 340 included in the weighing-divertor means, so that in these two embodiments the weigh buckets 330, 340 each also comprise holding means.

Figure 7:
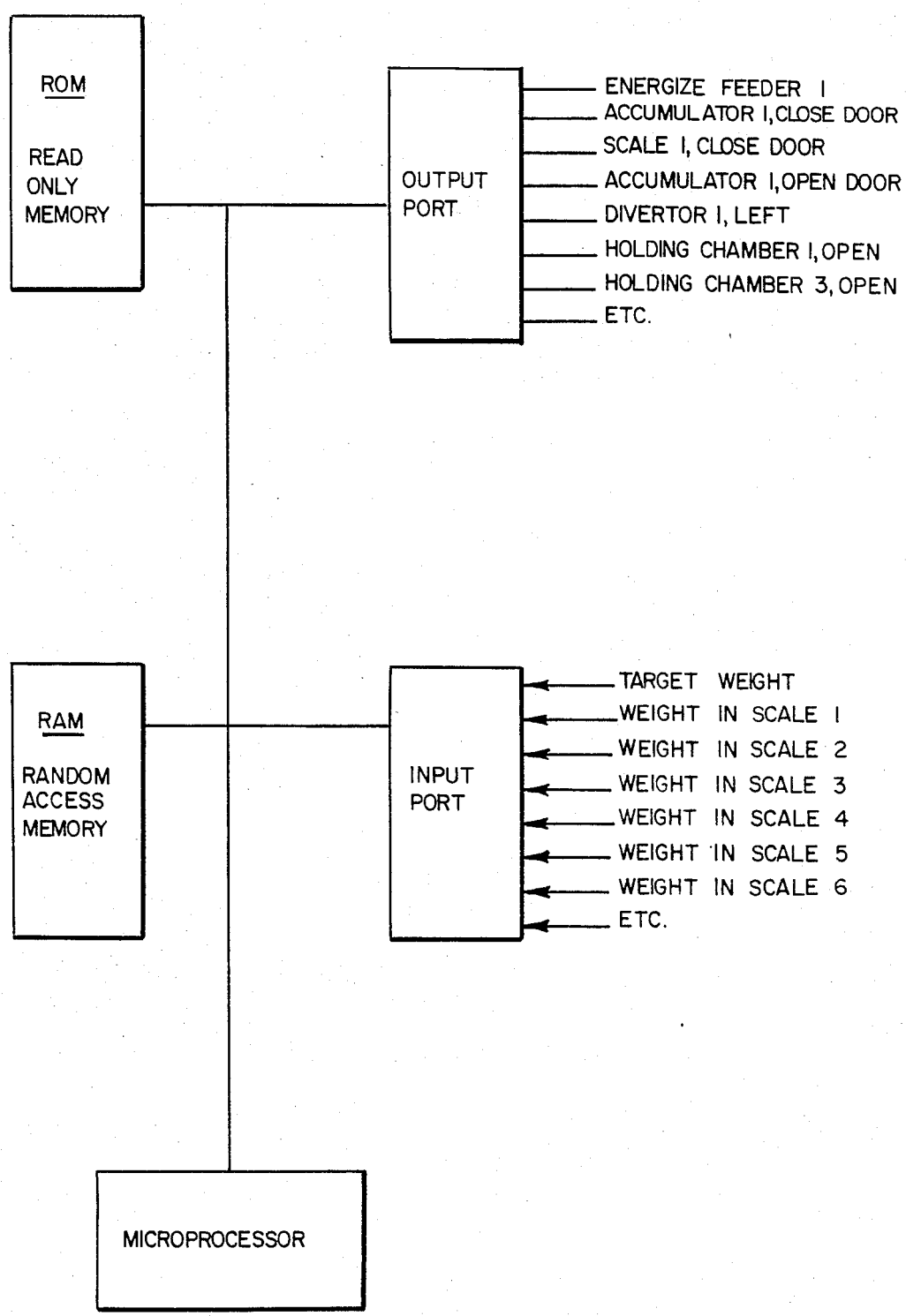
FIG. 7 is an exemplary operational system that may be utilized with the present invention.

FIG. 7 illustrates a sample operational means for a weighing machine as heretofore described. It is to be understood that this block diagram is exemplary of a representative operational means that utilizes a microprocessor. As would be clear to one skilled in the art, a variety of microprocessor and other peripheral equipment could be used, as could any number of discrete logic systems. This is attested to by other weighers that are publicly available as described in, for example, U.S. Pat. Nos. 3,939,928; 3,974,888; 4,106,628; and 4,206,822. The overall purpose of the operational means is to select the holding chambers which will discharge the contents thereof into the collecting means on any particular machine cycle, to cause that discharge to occur, and to regulate the flow of material to the holding chambers. Which holding chambers are discharged depends upon which combination of fractional weights therein results in the preferred weight. After one or more holding chambers have been emptied, the appropriate feeder trays, accumulators, scales, and divertors are energized as necessary to replenish the emptied holding chambers.

As illustrated in FIG. 7, a microprocessor system is used to monitor and control the status of various components of the weighing machine via the input and output ports and may also be used to monitor input signals from related packaging machinery. For instance, the system may direct the feeder means to be energized, open or close a door of a particular accumulator chamber, weigh bucket, or holding chamber, position a divertor, etc. The system may receive information regarding the weight of the product in the weigh buckets and the status of various components of the weigher from various sensing devices on the weigher. Other information may be supplied through a read only memory or a manual keyboard. This may include information unique to the product being weighed, the target weight, the range of acceptable weights, the length of time or amplitude of vibration for the feeder trays, various characteristics of the product being weighed etc. A random access memory is used by the microprocessor to carry out its functions and may be used to store information such as which doors are open on which accumulator chambers, weigh buckets, or holding chambers; which holding chamber each divertor is directed to; the weight of the product in each weigh bucket and holding chamber; etc. The random access memory may also be used to assist in carrying out the various calculations to determine the optimum combination of weights in the holding chambers that will yield the preferred weight. It is apparent that the steps taken in the monitoring and control of the weighing, and their sequence, may be determined by one skilled in the art to accomplish the desired results or implement the desired features. This is true whether one utilizes a microprocessor, discrete logic, or any other means to govern the operation of the weighing machine.

In operation, one begins by knowing the target weight. The microprocessor system has stored within it the weight of product located in each of the holding chambers 126-131 and 136-141 and a combination of those separate fractional weights will result in the preferred package weight. As previously mentioned, the preferred package weight may be that weight which is available from any combination of the different fractional weights of product located in the holding chambers which is closest to but not less than the target weight, but other criteria may be used. It is desirable to have the preferred product weight be comprised of product from four, five, or six of the twelve holding chambers. For the purpose of this description, assume that for one cycle of the weighing machine's operation the contents of holding chambers 126, 127, and 128 are selected. Under control of the microprocessor system, the contents of those holding chambers are discharged into the collecting means by opening the doors 146, 147, 148 at the bottom of the holding chambers for a short period of time. The divertors 106, 107, 108 which service those of the presently empty holding chambers are positioned as necessary to permit filling of the now empty holding chambers, and the doors 96, 97, 98 of the corresponding weigh buckets 86, 87, 88 are then opened for a brief period of time to permit the contents of the weigh buckets to be discharged into the appropriate holding chambers. (It will be noted that in a machine cycle where both holding chambers serviced by a single divertor are empty, only one of those holding chambers will be refilled. Thus on the next following machine cycle, the holding chamber which is not refilled will not have any product weight located within it. If desired, the machine cycle time can be lengthened to provide sufficient time to fill both holding chambers.) Following that, the doors 76, 77, 78 of the accumulator chambers 66, 67, 68 corresponding to the just emptied weigh buckets are opened permitting the contents of the associated accumulators to fall into the previously empty weigh buckets, and the accumulator doors are then closed. The scales are allowed to settle and the weight of material in each one is measured. While the settling and weighing occurs, the trays 50, 51, 52 which correspond to the empty accumulators are vibrated for a period of time, depending upon the type of product, its handling characteristics, and the target weight. This transfers product into the previously emptied accumulators.

While the trays 50, 51, 52 corresponding to the empty accumulator chambers 66, 67, 68 are vibrating, the remaining trays 53, 54, 55 do not vibrate so that any product that might drop on the remaining trays will rest on their receiving ends. Moreover, any product inadvertently falling off the discharge end of the remaining trays 53, 54, 55 is caught in the corresponding accumulator chambers 69, 70, 71. While trays 50, 51, 52 corresponding to the empty accumulators are vibrating, the ones of trays 28, 29, and 30 corresponding to trays 50, 51, 52, i.e., trays 28 and 29, are also vibrating to supply product thereto. The tray 30 does not vibrate because all the holding chambers supplied by it are full. Product drops off the discharge ends of feed trays 28, 29 onto feed trays 50, 51, 52, 53 of the third feed tray means. Product is supplied from a source to the weighing machine at a first feed tray 20 which also advances and evenly distributes the product by vibrating in a predetermined and well known manner. Product drops off the discharge end 26 in a relatively uniform curtain-like flow onto the three feed trays 28, 29, 30 of the second feed tray means.

The weighing machine thus far described includes twelve holding chambers 126-131 and 136-141. As stated above, it is desirable to have the preferred product weight be comprised of product from between four and six of the twelve holding chambers, and preferably five. Considering that in any one machine cycle some holding chambers may be empty, this number allows for the greatest possible number of different holding chamber combinations, thereby maximizing the number of possible combinations of product weight available and minimizing the deviation of the preferred weight from the target weight. Where the preferred weight is that combination of weights which is closest to but not less than the target weight, operating the weighing machine so that product from five holding chambers will normally make up the preferred weight minimizes, on average, the amount of product dispensed in excess of the target weight.

The microprocessor system has the ability to control the operation of the feed means 4 and the feed tray means 20, 22, and 24 in a servo system in response to the weight of product being measured by the weighing means. In the preferred embodiment of this invention, the servo system is comprised of essentially two control mechanisms.

The first of the control mechanisms operates with a relatively slow response time. As mentioned, there is an optimum number of holding chambers which will, on average, be used to make up the prefered weight. The target weight divided by that optimum number yields a target fractional weight. In the first control mechanism, the microprocessor is effective to add together all the fractional weights presently in all the scales and holding chambers of the machine and divide that total weight by the number of fractional weights present, i.e., the sum of the number of scales and holding chambers that presently contain product. This quotient is the average fractional weight. The vibrator feed of the feed tray means is then adjusted by the microprocessor in either time or amplitude in response to the deviation of the average fractional weight from the target fractional weight. The purpose of this first control mechanism is to insure that, on average, product from the optimal number of chambers is combined to make up the preferred weight.

The second of the control mechanisms operates with a relatively fast response time. Its purpose is to attempt to correct a situation where the average fractional weight on a particular machine cycle is excessively high or low. When the average fractional weight is excessively high, it reduces the amount of product fed to the accumulator during the next machine cycle to give a set of low fractional weights for use with the high fractional weight already in the machine to make up the preferred weight. When the average fractional weight is excessively low, it increases the amount of product fed to the accumulators during the present machine cycle to give a set of high fractional weights for use with the low frictional weights already in the machine to make up the preferred weight. The increase in product fed to the accumulator may be referred to as a spurt feed. It will be noticed that in the case of excessively high fractional weights, the set of low fractional weights is not available for combination into the preferred weight until two machine cycles later, whereas in the case of excessively low fractional weights, the set of high fractional weights will be available for combination into the preferred weight on the next machine cycle.

Figure 8:
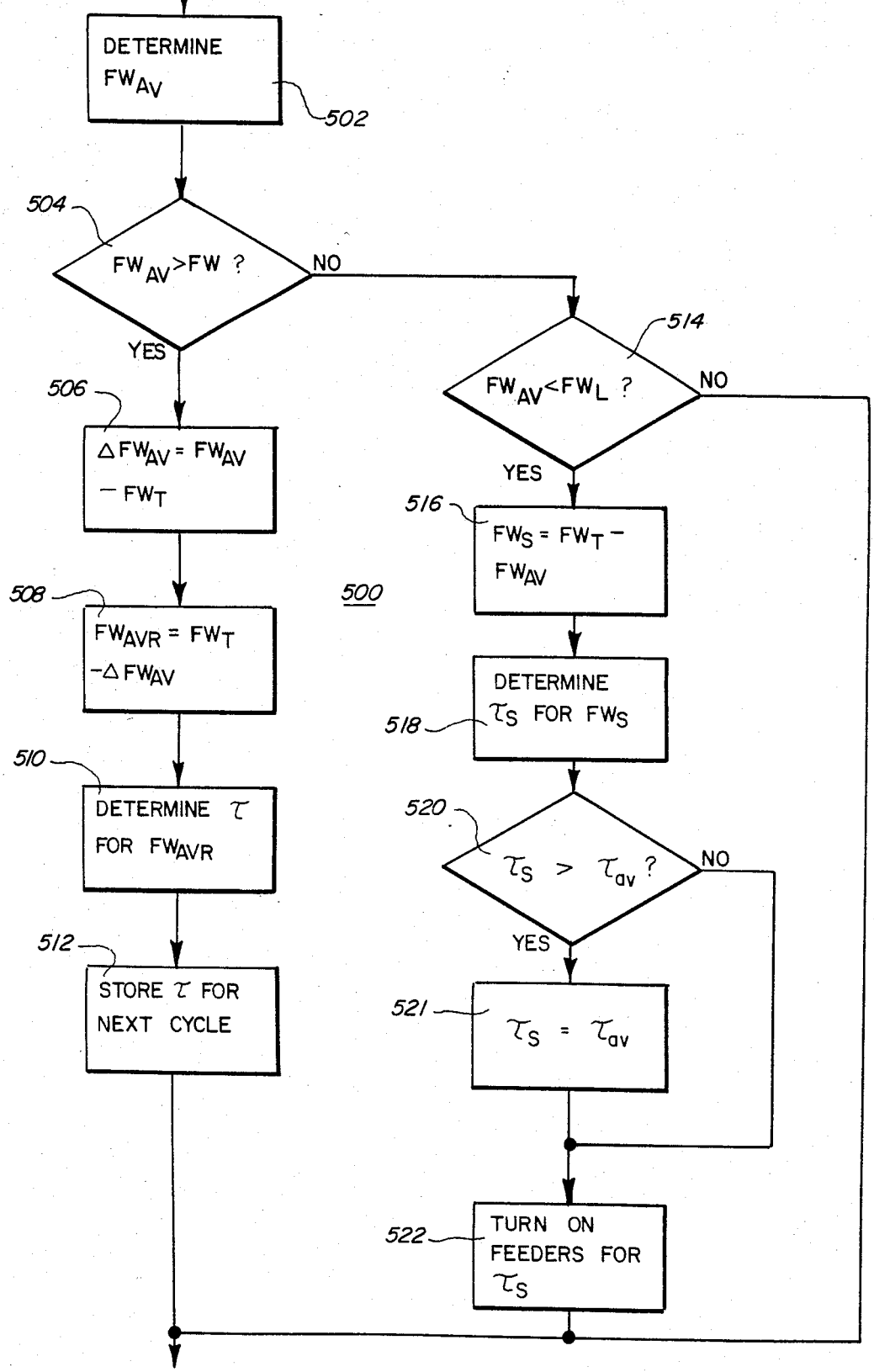
FIG. 8 is a flow diagram of a portion of the operational system of FIG. 7.

FIG. 8 is a flow diagram for the second control mechanism 500. The microprocessor first determines the average fractional weight present in the scales and holding chambers that presently contain product or will contain product at the end of a machine cycle, $FW_{AV}$, in block 502. The average fractional weight over which this second control mechanism is to provide correction, $FW_H$, as well as the average fractional weight under which this second control mechanism is to provide correction, $FW_L$, are both provided either through the manual keyboard or the ROM. Decision block 504 then compares $FW_{AV}$ and $FW_H$. If $FW_{AV}$ exceeds $FW_H$, the remainder of the control mechanism operates to determine the time of feeder operation, $\tau$, for the next machine cycle. Block 506 determines the difference, $\Delta FW$, between the average fractional weight and the target fractional weight; block 508 determines the desired reduced average fractional weight for the next machine cycle, $FW_{AVR}$, as the difference between the target fractional weight, $FW_T$, and $\Delta FW$; block 510 determines the time of feeder operation, $\tau$, required on the next machine cycle to feed the reduced average fractional weight, $FW_{AVR}$, of product to the accumulator on the next machine cycle, and block 512 then stores that value of $\tau$ for use during the next machine cycle. However, if the result of division of block 504 is that the average fractional weight, $FW_{AV}$, does not exceed $FW_L$, division block 514 operates to determine if $FW_{AV}$ is less than $FW_L$. If not, second control mechanism 500 is exited, but if so, blocks 511-522 determine the period for which the feeder means should spurt feed the accumulator means during the present machine cycle. In particular, block 516 determines the fractional weight needed to be fed to the accumulator mean, $FW_s$, by subtracting the average fractional weight $FW_{AV}$ from the target fractional weight, $FW_T$. Block 518 determines the time $\tau_s$ the feeder means should be spurt fed to supply to the accumulator means the weight $FW_s$, of product. Decision block 520 determines whether the determined $\tau_s$ exceeds the maximum time available for spurt feed, $\tau_{av}$; if so, the block 521 sets $\tau_s$ equal to $\tau_{av}$ and block 522 turns on the feeder means for $\tau_s$, but if not the block 522 simply turns in the feeder means for $\tau_s$. The second control mechanism 500 is then exited.

In the present invention product is first fed into the individual accumulators and then into the row of weighing means 8 rather than directly into the weighing means. This use of an accumulator converts the generally continuous flow of product from the feeder means 4 to the row of weighing means into discrete amounts of product, and provides additional time in the operational cycle for the weighing means to make a correct weight determination since any oscillations will have been damped and the scale will have settled. The feeding of product into the accumulator means 6 takes time, and the length of time varies depending upon the feed characteristics of the product and the amount of product being fed. Without the use of the accumulator means, this feed time must be added to the time required for the scale to settle to obtain a valid weight. This would reduce the cycles per unit time, reduce efficiency, and reduce throughput. Due to the novel use of accumulating means 6, weighing means 8, and holding means 12, many of the foregoing steps may proceed simultaneously, which boosts production and efficiency. For instance, while the scale is settling and the product is being weighed, an accumulator may be filling and one or both of the corresponding holding chambers may be dumping product into the collector. Further, a time period is required after the weights are obtained to make the necessary calculations to select the preferred weight. The use of holding chambers permits the calculating period to occur after the product has been discharged from the scales to the holding chambers, thus permitting a decrease in the cycle time. And, due to the even and in-line distribution of product across the feeder means 4, each accumulator, scale, and holding chamber combination operates at peak efficiency without the "surges" and "starves" that plague circular configurations.

While the invention has heretofore been described in detail with particular reference to illustrated embodiments, it is to be understood that variations, modifications, and the substitution of equivalent mechanisms can be effected without departing from the scope of this invention. For instance, one may use any number of known electromechanical systems to monitor and govern the operation of the weighing machine.

What is claimed is:

1. A weighing machine for providing a quantity of product having a predetermined weight, comprising
    feeder means to selectively transport product supplied by a product source;
    a plurality of accumulating means to receive product from said feeder means and selectively discharge discrete amounts of product therefrom;
    a plurality of weighing-divertor means, one for each accumulating means, to receive a discrete amount of product from one of said accumulating means, determine the weight thereof, and selectively discharge said product in one of a plurality of predetermined directions;
    a plurality of holding means, multiple holding means for each weighing-diverter means, to receive a discrete weighed amount of product from said weighing divertor means, retain it, and selectively discharge it therefrom; and
    collecting means to receive discrete amounts of product from any of said holding means, consolidate it, and direct it to another location.

2. A weighing machine for providing a quantity of product having a predetermined weight, comprising:
    feeder means to selectively transport product supplied by a product source;
    a plurality of accumulating means to receive product from said feeder means and selectively discharge discrete amounts of product therefrom;
    a plurality of weighing means, one for each accumulating means, to receive a discrete amount of product from one of said accumulating means, determine the weight thereof, and selectively discharge said product therefrom;
    a plurality of divertor means, one for each weight sensing means, to receive a discrete weighed amount of product from one of said weighing means and channel it in one of a plurality of directions;
    a plurality of holding means, multiple holding means for each divertor means, to receive a discrete weighed amount of product from said divertor means, retain it and selectively discharge it therefrom; and
    collecting means to receive discrete amounts of product from any of said holding means, consolidate it, and direct it to another location.

3. A weighing machine as in claim 1 wherein each of said weighing-divertor means comprises a chamber open on top to receive product, and a pair of selectively operable bottom opening doors on opposite sides of said chamber that open and close independently to discharge product therefrom in opposite directions.

4. A weighing machine as in claim 1 further comprising servo means coupled to said feeder means and said weighing-divertor means and controlling the operation of said feeder means in response to the weight of the product in said weighing-divertor means.

5. A weighing machine as in claim 2 wherein each of said weighing means comprises a weigh bucket open on top to receive product, a selectively operable bottom opening door to discharge product therefrom, a weight sensing means to determine the weight of the product in said chamber, and a door operating means to selectively open and close said bottom opening door.

6. A weighing machine as in claim 2 further comprising servo means coupled to said weighing means and said feeder means and controlling the operation of said feeder means in response to the weight of the product in said weighing means.

7. A weighing machine as in claim 2 further comprising electronic means including computing means to receive input signals from said weighing means, and determine the possible weight combinations available by selectively combining on a logical basis the discrete amounts of product in each of the said holding means.

8. A weighing machine as in claim 1 or 2 wherein said feeder means comprises, in series, a plurality of individually selectively operable tray means.

9. A weighing machine as in claim 1 or 2 wherein said product flow therethrough is generally in-line.

10. A weighing machine as in claim 1 or 2 wherein each said accumulating means comprises an accumulator chamber open on top to receive product, a selectively operable bottom opening door to discharge product therefrom, and a door operating means to selectively open and close said bottom opening door.

11. A weighing machine as in claim 1 or 2 wherein each of said holding means comprises a chamber open on top to receive product, a selectively operable bottom opening door to discharge product therefrom, and a door operating means responsive to said electronic means to selectively open and close said bottom opening door.

12. A weighing machine as in claim 1 or 2 wherein said collecting means is funnel shaped.

13. A weighing machine for providing a quantity of product having a predetermined weight, comprising:
    feeder means to selectively transport product supplied by a product source, said feeder means comprising first tray means, second tray means, and third tray means in series to subdivide said product into a multiplicity of selectively individually controllable product feeds;

a plurality of accumulating means to receive product from said feeder means, one accumulating means for each of said product feed, each accumulating means comprising an accumulator chamber having a selectively individually controllable bottom opening door, a plurality of weighing means to receive product from said accumulating means, one weighing means for each accumulating means and each of said weighing means comprising a weigh bucket having a selectively individually controllable bottom opening door;

a plurality of divertor means to receive product from said weighing means, one divertor means for each weighing means and each of said divertor means comprising a pivotally mounted tube being selectively individually pivotable to a plurality of positions;

a plurality of holding means to receive product from said divertor means, one holding means for each of said divertor pivot positions, each of said holding means comprising a holding chamber having a selectively individually controllable bottom opening door; and collecting means to receive product from any of said holding chamber means, consolidate it, and direct it to another location.

14. A weighing machine of claim 13 further comprising servo means coupled to said weighing means and said feeder means and controlling the operation of said feeder means in response to the weight of the product in said weighing means.

15. A weighing machine of claim 14 wherein said servo means further controls said feeder means to adjust the average weight of product in each of said weighing means towards a target fractional weight.

16. A weighing machine of claim 14 wherein said servo means further comprises a first control means for adjusting the average weight of product in each of said weighing means towards a target fractional weight over a relatively long time period and a second control means for adjusting the weight of product delivered to said accumulating means during a cycle of said weighing machine and the next following machine cycle in response to the weight of product in each of said weighing means and said holding means during that machine cycle.

17. A weighing machine for providing a quantity of product having a predetermined weight, comprising:

feeder means to selectively transport product supplied by a product source and comprising, in series, independently operable first feed tray means to receive product from said product source and feed it to a second feed tray means, second feed tray means comprising a plurality of individually operable trays to feed product to a third feed tray means, and third feed tray means comprising a plurality of individually operable trays to feed product to said accumulator means, whereby the amount of product flow may be controlled through selective activation of said first feed tray means and each of said individual trays in said second and third feed tray means;

a plurality of accumulating means to receive product from said feeder means and selectively discharge discrete amounts of product therefrom;

a plurality of weighing-divertor means, one for each accumulating means, to receive a discrete amount of product from one of said accumulating means, determine the weight thereof, and selectively discharge said product in one of a plurality of predetermined directions;

a plurality of holding means, multiple holding means for each weighing-divertor means, to receive a discrete weighed amount of product from said weighing-divertor means, retain it, and selectively discharge it therefrom; and collecting means to receive discrete amounts of product from any of said holding means, consolidate it, and direct it to another location.

18. A weighing machine for providing a quantity of product have a predetermined weight, comprising:

feeder means to selectively transport product supplied by a product source and comprising, in series, independently operable first feed tray means to receive product from said product source and feed it to a second feed tray means, second feed tray means comprising a plurality of individually operable trays to feed product to a third feed tray means, and third feed tray means comprising a plurality of individually operable trays to feed product to said accumulator means, whereby the amount of product flow may be controlled through selective activation of said first feed tray means and each of said individual trays in said second and third feed tray means;

a plurality of accumulating means to receive product from said feeder means and selectively discharge discrete amounts of product therefrom;

a plurality of weighing means, one for each accumulating means, to receive a discrete amount of product from one of said accumulating means, determine the weight thereof, and selectively discharge said product therefrom;

a plurality of divertor means, one for each weight sensing means, to receive a discrete weighed amount of product from one of said weighing means and channel it in one of a plurality of directions;

a plurality of holding means, multiple holding means for each divertor means, to receive a discrete weighed amount of product from said divertor means, retain it and selectively discharge it therefrom; and collecting means to receive discrete amounts of product from any of said holding means, consolidate it, and direct it to another location.

19. A weighing machine for providing a quantity of product having a predetermined weight, comprising:

feeder means to selectively transport product supplied by a product source;

a plurality of accumulating means to receive product from said feeder means and selectively discharge discrete amounts of product therefrom;

a plurality of weighing means, one for each accumulating means to receive a discrete amount of product from one of said accumulating means, determine the weight thereof, and selectively discharge said product therefrom;

a plurality of divertor means, one for each weight sensing means, to receive a discrete weighed amount of product from one of said weighing means and channel it in one of a plurality of directions;

a plurality of holding means, multiple holding means for each divertor means, to receive a discrete weighed amount of product from said divertor means, retain it and selectively discharge it therefrom, each of said divertor means comprising a generally vertically oriented tube having one end pivotally mounted to receive product from one of said weighing means and the other end moveable to direct said product into one of said associated holding means; and collecting means to receive discrete amounts of product from any of said holding means, consolidate it, and direct it to another location.

20. A weighing machine for providing a quantity of product having a predetermined weight, comprising:

feeder means to selectively transport product supplied by a product source;

a plurality of accumulating means to receive product from said feeder means and selectively discharge discrete amounts of product therefrom;

a plurality of weighing-divertor means, one for each accumulating means, to receive a discrete amount of product from one of said accumulating means, determine the weight thereof, and selectively discharge said product in one of a plurality of predetermined directions;

a plurality of holding means, multiple holding means for each weighing-divertor means, to receive a discrete weighed amount of product from said weighing-divertor means, retain it, and selectively, discharge it therefrom; and collecting means to receive discrete amounts of product from any of said holding means, consolidate it, and direct it to another location and comprising chute means disposed immediately underneath said holding means to receive product therefrom, and conveying means to receive product from said chute means, said chute means mounted for selective pivotal movement to an inclined position to cause the product received from said holding means to slide thereon to said conveying means.

21. A weighing machine for providing a quantity of product having a predetermined weight, comprising:

feeder means to selectively transport product supplied by a product source;

a plurality of accumulating means to receive product from said feeder means and selectively discharge discrete amounts of product therefrom;

a plurality of weighing means, one for each accumulating means, to receive a discrete amount of product from one of said accumulating means, determine the weight thereof, and selectively discharge said product therefrom;

a plurality of divertor means, one for each weight sensing means, to receive a discrete weighed amount of product from one of said weighing means and channel it in one of a plurality of directions;

a plurality of holding means, multiple holding means for each divertor means, to receive a discrete weighed amount of product from said divertor means, retain it and selectively discharge it therefrom; and collecting means to receive discrete amounts of product from any of said holding means, consolidate it, and direct it to another location and comprising chute means disposed immediately underneath said holding means to receive product therefrom, and conveying means to receive product from said chute means, said chute means mounted for selective pivotal movement to an inclined position to cause the product received from said holding means to slide thereon to said conveying means.

22. A weighing machine for providing a quantity of product having a predetermined weight, comprising:

feeder means to selectively transport product supplied by a product source;

a plurality of accumulating means to receive product from said feeder means and selectively discharge discrete amounts of product therefrom, said accumulating means being disposed in substantially in-line relationship;

a plurality of weighing-divertor means, one for each accumulating means, to receive a discrete amount of product from one of said accumulating means, determine the weight thereof, and selectively discharge said product in one of a plurality of predetermined directions, said weighing-divertor means being disposed in substantially in-line relationship;

a plurality of holding means, multiple holding means for each weighing-divertor means, to receive a discrete weighed amount of product from said weighing-divertor means, retain it, and selectively discharge it therefrom; and collecting means to receive discrete amounts of product from any of said holding means, consolidate it, and direct it to another location.

23. A weighing machine for providing a quantity of product having a predetermined weight, comprising:

feeder means to selectively transport product supplied by a product source;

a plurality of accumulating means to receive product from said feeder means and selectively discharge discrete amounts of product therefrom, said accumulating means being disposed in substantially in-line relationship;

a plurality of weighing means, one for each accumulating means, to receive a discrete amount of product from one of said accumulating means, determine the weight thereof, and selectively discharge said product therefrom, said weighing means being disposed in substantially in-line relationship;

a plurality of divertor means, one for each weight sensing means, to receive a discrete weighed amount of product from one of said weighing means and channel it in one of a plurality of directions, said divertor means being disposed in substantially in-line relationship;

a plurality of holding means, multiple holding means for each divertor means, to receive a discrete weighed amount of product from said divertor means, retain it and selectively discharge it therefrom; and collecting means to receive discrete amounts of product from any of said holding means, consolidate it, and direct it to another location.

* * * * *

UNITED STATES PATENT AND TRADEMARK OFFICE
CERTIFICATE OF CORRECTION

PATENT NO. : 4,538,693

DATED : September 3, 1985

INVENTOR(S) : King L. Klopfenstein et al

It is certified that error appears in the above-identified patent and that said Letters Patent is hereby corrected as shown below:

Column 9, line 31, "microprosessor" should read -- microprocessors --.

Column 12, line 5, "frictional" should read -- fractional --.

Column 13, line 52, "weighing-diverter" should read -- weighing-divertor --.

Column 16, line 19, "have" should read -- having --; and

Column 16, line 63, "means" should read -- means, --.

Signed and Sealed this

Twenty-fourth Day of December 1985

[SEAL]

Attest:

DONALD J. QUIGG

Attesting Officer

Commissioner of Patents and Trademarks